United States Patent [19]

Pennace et al.

[11] Patent Number: 4,684,557
[45] Date of Patent: Aug. 4, 1987

[54] SILICONE PRESSURE-SENSITIVE ADHESIVE LAMINATES AND SILICONE RELEASE LAYERS THEREFORE

[75] Inventors: John R. Pennace, Cambridge, Mass.; Sharon A. Quinn, Brookline, N.H.

[73] Assignee: Flexcon Company, Inc., Spencer, Mass.

[21] Appl. No.: 296,701

[22] Filed: Aug. 27, 1981

Related U.S. Application Data

[63] Continuation of Ser. No. 99,265, Feb. 20, 1980, abandoned, which is a continuation of Ser. No. 58,983, Jul. 10, 1979, abandoned, which is a continuation of Ser. No. 969,254, Dec. 13, 1978, abandoned, which is a continuation of Ser. No. 759,154, Jan. 13, 1977, abandoned, which is a continuation-in-part of Ser. No. 558,324, Mar. 14, 1975, abandoned, which is a continuation-in-part of Ser. No. 538,588, Jan. 6, 1975, abandoned.

[51] Int. Cl.$^4$ .............................................. A61F 13/02
[52] U.S. Cl. .................................... 428/40; 428/447; 428/448; 428/452; 428/352; 428/354; 428/355; 427/391; 427/411; 427/208.4

[58] Field of Search ............... 428/447, 448, 452, 352, 428/354, 355, 40; 427/391, 207 B, 411

[56] References Cited

U.S. PATENT DOCUMENTS

| | | | |
|---|---|---|---|
| 2,857,356 | 10/1958 | Goodwin | 428/447 |
| 3,509,991 | 5/1970 | Hurst | 428/352 |
| 3,527,842 | 9/1970 | Clark | 428/447 |
| 3,933,702 | 1/1976 | Caimi et al. | 428/352 |
| 3,936,582 | 2/1976 | Keiser | 428/452 |
| 4,016,328 | 4/1977 | Horning | 428/447 |
| 4,039,707 | 8/1977 | O'Malley | 428/447 |

Primary Examiner—Edith Buffalow
Attorney, Agent, or Firm—George E. Kersey

[57] ABSTRACT

A silicone pressure-sensitive adhesive release laminate having a support coated on at least one side with a silicone release layer, and over the release layer, a pressure-sensitive silicone adhesive. The release force required to separate the adhesive from the release layer is less than about 200 grams per inch, and preferably less than 100 grams. The release layer is a silicone release polymer having a high degree of cross-linking formed from at least one prepolymer having a viscosity below about 1000 centipoises at 25° C.

10 Claims, 7 Drawing Figures

SILICONE PRESSURE-SENSITIVE ADHESIVE LAMINATES AND SILICONE RELEASE LAYERS THEREFORE

CROSS-REFERENCE TO RELATED APPLICATIONS

This application is a continuation of Ser. No. 099,265, filed on Feb. 20, 1980; which is a continuation of Ser. No. 058,983 filed on July 10, 1979; and a continuation of Ser. No. 969,254 filed on Dec. 13, 1978 and a continuation of Ser. No. 759,154 filed Jan. 13, 1977 and a continuation in part of Ser. No. 558,324 filed Mar. 14, 1975 which in turn is a continuation in part of Ser. No. 538,588 filed Jan. 6, 1975, all now abandoned.

BACKGROUND OF THE INVENTION

Pressure-sensitive adhesives are well known and are in substantial commercial use to secure tapes, labels, or other articles to receiving surfaces. Such adhesives can be attached to a variety of materials by means of pressure. Tapes coated with adhesive on both sides are used to join two articles together. Pressure-sensitive adhesives are generally based on elastomeric polymers such as natural or synthetic rubbers and, as is well known in the art, can be compounded with extenders, plasticizers, tackifiers and other materials to provide specifically desired properties. Examples of such materials and their use is shown in numerous prior art patents, including U.S. Pat. Nos. 3,085,903; 3,246,049; 3,356,635; 3,501,365; and 3,532,652.

Because such adhesives are tacky, it is customary to cover their exposed surface(s) temporarily and removably with a release layer, typically a non-tacky silicone polymer, for handling, storage and dispensing. Such products include label stock in which the label base or support is bonded to the adhesive and the exposed adhesive surface covered with a silicone release coated paper or film; spirally wound tapes comprising a film or paper support having one surface bonded to the adhesive, with the exposed adhesive surface being in contact with a release layer carried either by the opposite side of the same support or by a separate interleaving support; and spirally wound transfer tapes wherein the support is coated on both sides with release layers, one of which is overcoated with the adhesive. The adhesive can be initially formed either directly to the support surface or to the release surface. The latter is necessary for transfer tapes having release coatings on both sides of the support. Consistently low uniform release forces between the adhesive and release layer are more difficult to obtain when the adhesive is solidified from a liquid in contact with the release layer surface. The term "laminate" as used herein refers to a structure having at least one support, temporary or permanent, a pressure-sensitive adhesive layer, and at least one release layer in surface contact with the adhesive, whether or not other layers such as a second release layer or a second support are also present.

Elastomeric, pressure-sensitive silicone adhesives have been known for some time and have attractive properties, particularly a large range of temperatures, both high and low, to which they can be exposed, chemical stability, and good adhesion to a variety of materials. However, such silicone pressure-sensitive adhesives adhere with high tenacity to conventional release surfaces, such that conventional release papers often tear before releasing, and their use has been limited generally to application without a release layer or to tapes of plastic films strong enough to withstand the considerable release forces required to unwind the spiral tape. Ridged release surfaces to reduce the contact area have also been employed with limited success and increased expense.

OBJECTS OF THE INVENTION

Objects of the present invention include provision of a silicone polymer pressure-sensitive adhesive laminate with a release layer of silicone release polymer which is readily releasible for use, both immediately after preparation and for extended storage periods thereafter; silicone adhesive laminate structures which can be releasably separated with stripping or release forces generally comparable with non-silicone pressure-sensitive adhesive laminates heretofore known; and silicone pressure-sensitive laminate structures which permit the use of existing pressure-sensitive application techniques and equipment.

SUMMARY OF THE INVENTION

Silicone release resins are sold as essentially linear polymers or prepolymers in liquid form, with and without solvents, for coating onto paper, film or other support. After coating, they are cured, typically by heat and catalyst, to form solid, non-tacky, cross-linked polymers in situ. These linear prepolymer resins are believed to be formed from chlorosilanes and to consist predominantly of repeating units of the structure

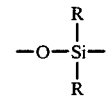

wherein R is hydrogen or hydrocarbon radicals principally lower alkyl groups and most typically methyl. The degree of polymerization is such as to produce a liquid linear prepolymer material with no significant cross linkage. While liquids are preferred and used commercially, higher molecular weight wax-like solids could be substituted where sufficient solvent or heat is practical to provide fluidity for coating without premature curing. It is believed that presently known silicone linear release prepolymers consist of at least 95 percent repeating units of the above structure with reactive end groups, but that small quantities of other modifying units may be present, if desired. Such release materials are described, for example in an article by Alvin E. Bey, entitled "New Developments in Silicone Release Coatings for Pressure-Sensitive Adhesives", in the October, 1972 issue of *Adhesives Age*, pages 29–32.

In accordance with the present invention, it has been found that silicone pressure-sensitive adhesives can be contacted with release layers comprising selected removable silicone release polymers, stored for extended periods, and removed for use when needed with equipment and forces generally comparable to those heretofore employed with rubber and acrylic-based adhesives. These advantages are obtained by employing a silicone release polymer which is highly cross-linked. The degree of cross-linking can be conveniently measured by the absorption of solvent, the greater the degree of cross-linking, the less the absorption of solvent. Silicone release polymers are sufficiently cross-linked for use with the laminates of the present invention if they absorb less than about 200% of their cured weight of the solvent heptane, when measured as follows. A sample of the liquid coating material catalyzed for curing is placed in a container from which it can be removed after curing, for example a small laboratory weighing dish of aluminum foil. Inert solvent, if present, is then removed and the liquid fully cured. A sufficient sample should be used to provide a cured thickness of about one fourth inch. The cured sample is then removed, weighed, and immersed in heptane for a period sufficient for the sample to reach substantially constant weight. The sample is then removed from the heptane, the surface dried by blotting and the sample reweighed. The increase in weight represents the amount of heptane absorbed. When measured by this technique, it has been found that conventional silicone release polymers will absorb about 600% or more of their original weight and that the increase in weight often continues well beyond 24 hours. Preferred materials according to the present invention usually attain substantially constant weight within twenty-four hours.

The release mechanism is not well understood. However, it has been previously theorized, for example in the article by Bey cited above, that it involves a low polarity surface of low surface tension, highly flexible polymer chains, incompatibility of release surface with dissimilar adhesive polymers in contact therewith, and that the degree of cross-linking affects the release forces obtained. However, such theories have not led to successful release laminates for silicone pressure-sensitive adhesives. Surprisingly, and in accordance with the present invention, it has been discovered that if the degree of cross-linking is substantially increased over prior practice, low release value laminates with silicone adhesives can be obtained even though the flexibility of the release polymer is reduced and the polymeric materials in contact have substantial similarity.

A variety of chemical means are known for obtaining a high cross-link density. For example, a high degree of functionality can be provided on the polysiloxane prepolymer, for example silicon-bonded hydrogen or vinyl substituents, which are polymerized and cross-linked with polyfunctional cross-linking agents. Additive reactions between unsaturated hydrocarbon groups such as vinyl or the like and silicon-bonded hydrogens are preferred. The unsaturated hydrocarbon groups may be provided as reactive groups on a polysiloxane prepolymer, as in Example VI hereinafter, or in a hydrocarbon molecule, preferably of low molecular weight, as in Example I. It is also preferred that polysiloxane prepolymers be employed all or a majority of which are of low molecular weight, preferably having a Brookfield viscosity at 25° C. below about 1000 centipoises, corresponding to a molecular weight below about 25,000. Such lower molecular weight prepolymers are believed to minimize steric problems in attaining a highly cross-linked structure. The total liquid coating prepolymer composition, absent inert solvent, preferably has a viscosity below about 1000 centipoises and most preferably considerably less.

It is preferred that the silicone release layers of the present invention be formed from reactive polysiloxane prepolymer compositions having a substantial content of silicon-bonded hydrogen substituents sufficient to provide an IR absorption ratio from base line of Si-H absorption at about 4.5 to 4.8 microns, to C-H absorption at about 3.0 to 3.5 microns, above about 0.4. Such silicon-bonded hydrogen containing prepolymers can comprise the major component, as in Examples I-V, which can be highly cross-linked with co-reactive silanes or small multivinyl containing cross-linking agents or similar reactive unsaturated compound such as dicyclopentadiene, or, as illustrated in Example VI, can be employed to cross-link with other co-reactive polysiloxane prepolymers having sufficient co-reactive substituents, preferably vinyl groups, to provide a siloxane copolymer having a high degree of cross-linking. Catalysts for the above reactions are known and are exemplified in the Examples.

DESCRIPTION OF THE INVENTION

These IR absorption spectrographs were prepared by placing a cast film, free of solvent, in or on a sodium chloride capacillary cell or plate, cells being used for lower viscosity materials where too little is retained on a plate (FIGS. 2, 4, 5 and 7) and plates for higher viscosity materials (FIGS. 1, 3 and 6), and the runs performed on an INFRACORD prism IR spectrophotometer. The cast film should be of a thickness such that both absorption peaks herein described, when present, fall within about the 0.2 to 0.7 absorption regions.

Figure 7:
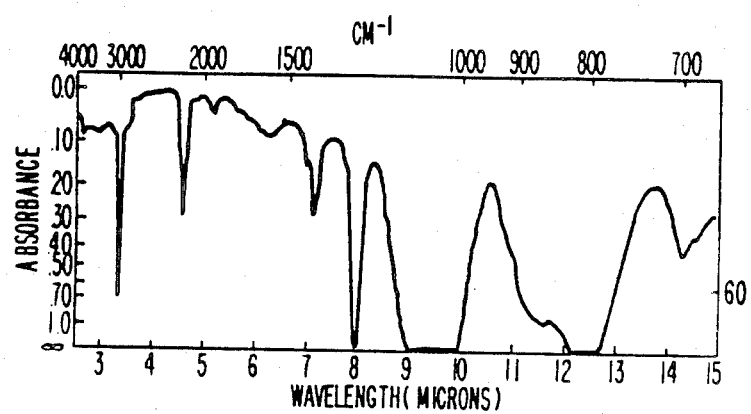

Referring to FIG. 7, the ratio of absorption at 4.5 to 4.8 microns, from base line to the absorption at 3.0 to 3.5 microns was measured as follows. The first peak absorption was read to be 0.72 at 3.4 microns. At 3.4 microns the base line was estimated to be 0.05 by straight line extrapolation across the absorption peak as indicated by the broken line. The absorption at 3.4 microns was therefore determined to be 0.67 (0.72 minus 0.05). Similarly the second absorption peak was read to be 0.29 at 4.6 microns and the base line estimated to be 0.015. This absorption at 4.6 microns was therefore 0.275 (0.29 minus 0.015). The ratio was therefore 0.275 divided by 0.67 or 0.41.

IR ratios from FIGS. 1-7 were calculated as indicated above and are listed in the following TABLE I.

TABLE I

Figure 1:
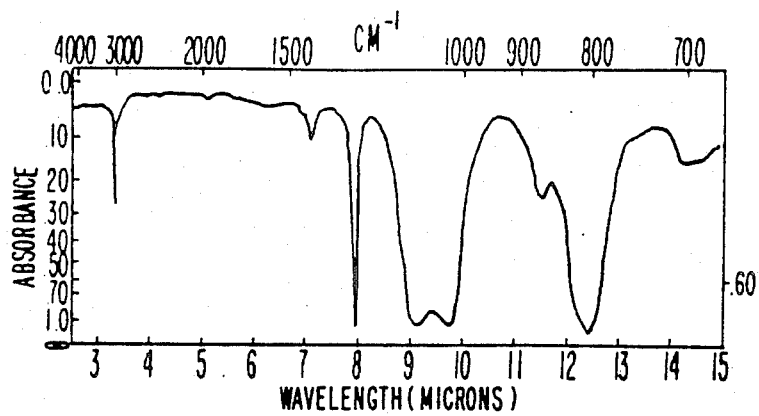
FIG. 1 is an infrared (IR) spectrographic absorption chart for silicone release resin prepolymer No. 4280 of the General Electric Company.
Figure 2:
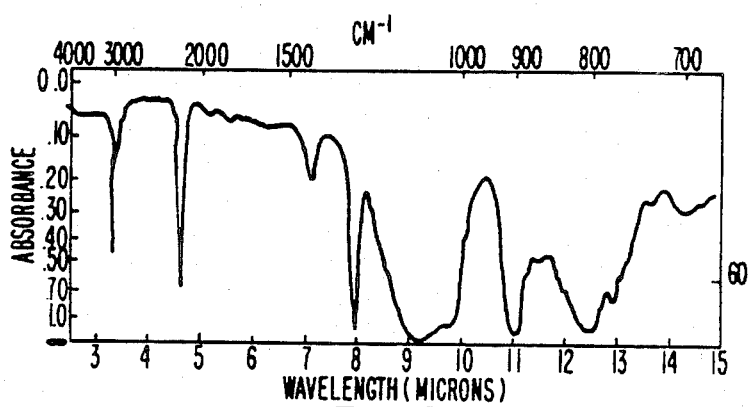
FIG. 2 is an IR spectrographic absorption chart for silicone release prepolymer SS4281C of the General Electric Company.
Figure 3:
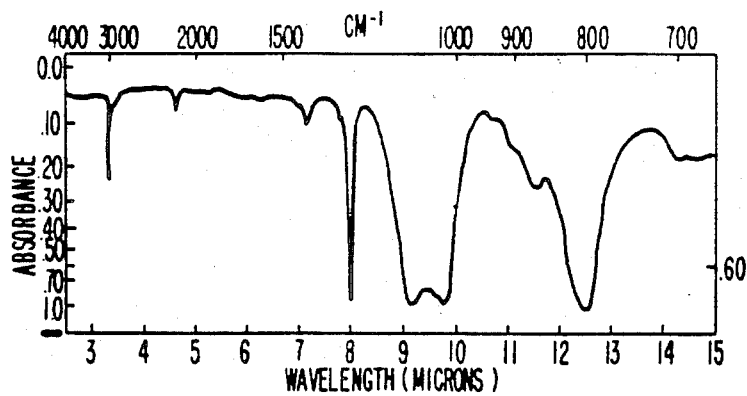
FIG. 3 is an IR spectrographic absorption chart for silicone release prepolymer No. 4191 of the General Electric Company.
Figure 4:
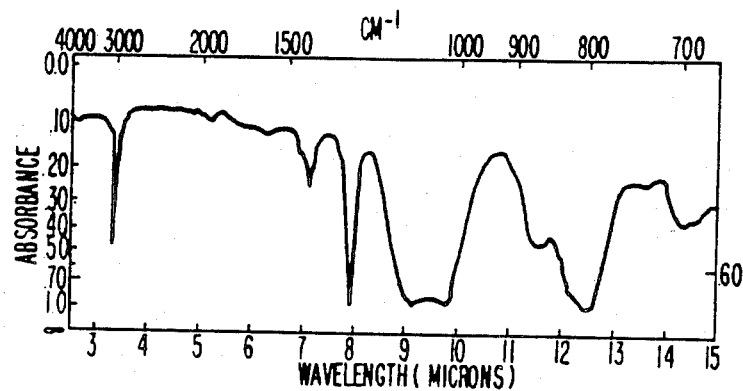
FIG. 4 is an IR spectrographic absorption chart for silicone release prepolymer No. X2-7018 of the Dow Corning Corporation.

| Absorption at: | 4.5–4.8 | 3.0–3.5 | RATIO |
| --- | --- | --- | --- |
| FIG. 1 | — | 0.19 | — |
| FIG. 2 | 0.65 | 0.43 | 1.51 |
| FIG. 3 | 0.05 | 0.20 | 0.25 |
| FIG. 4 | — | 0.47 | — |

TABLE I-continued

Figure 5:
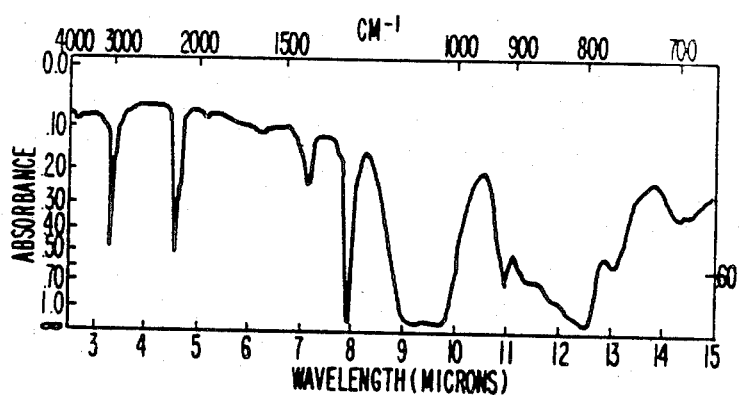
FIG. 5 is an IR spectrographic absorption chart for silicone release prepolymer No. X2-7016 of the Dow Corning Corporation.
Figure 6:
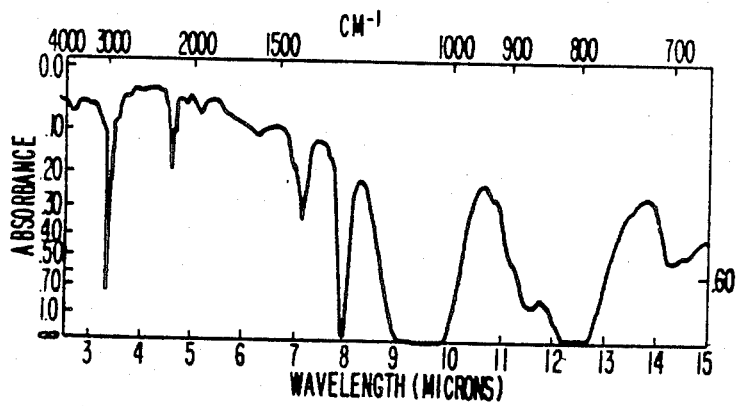
FIG. 6 is an IR spectrographic absorption chart for silicone release prepolymer No. 23/30 of the Dow Corning Corporation; and, FIG. 7 is an IR spectrographic absorption chart for silicon release prepolymer EP 6396 of the Imperial Chemical Industries, Ltd., Stevenston, Ayrshire, Scotland.

| Absorption at: | 4.5–4.8 | 3.0–3.5 | RATIO |
|---|---|---|---|
| FIG. 5 | 0.45 | 0.43 | 1.03 |
| FIG. 6 | 0.17 | 0.72 | 0.24 |
| FIG. 7 | 0.275 | 0.67 | 0.41 |

As sold commercially and recommended for use by the suppliers, the prepolymers of FIGS. 1 and 2 and also of FIGS. 4 and 5 are mixed in the proportion of 10 weight parts of the first material to 1 weight part of the second material and coated with or without solvent and cured to form release layers. The materials of FIGS. 3 and 6 are conventional solvent coating release materials, cured with catalyst and small quantities of reactive silanes as recommended by the suppliers. The material of FIG. 7 is a solventless coating material cured with added platinic acid catalyst containing dicyclopentadiene as recommended by the supplier.

When such materials are coated onto densified release paper, cured, and laminated to conventional rubber or acrylic-based pressure-sensitive adhesives, good stable release forces are generally obtained for solvent applied release layers in the range of 16 to 40 grams per inch of width at slow speed and 40 to 100 grams per inch of width at high speed, measured as more fully explained in Example 1 below.

The coatings applied without solvents generally give about one-half these values. However, when laminated to silicone-based pressure-sensitive adhesives, especially after a few days of storage, conventional release sheets often tear before release is obtained. Also, the tack or adhesion of the silicone adhesives is sometimes diminished, believed to be due to retention of release polymer on the surface of the adhesive.

Preferred embodiments of the present invention are given in the following examples.

EXAMPLE I

A conventional 4-pound per ream (250,000 square inches) super calendered densified Kraft release carrier paper was coated as follows. Imperial Chemical Industries Limited, Ayrshire, Scotland, (ICI) silicone-release polymer EP 6396, having a viscosity of about 70 centipoises, was mixed with ICI catalyst EP 6439 (platinic acid type and containing dicyclopentadiene) in the weight ratio of 1.5 parts catalyst to 100 parts resin and placed in the pan of an offset gravure coating apparatus. EP 6396 is believed to be predominately silanol terminated polydimethylsiloxane having a viscosity of 60 to 100 centipoises at 25° C., in combination with a minor proportion of polymethylhydrogensiloxane having a viscosity of about 25 centipoises at 25° C. The gravure roll, partially immersed in the pan, was a 150 line per inch engraved steel roll employed with a rubber transfer roll operated at a roll speed ratio of 1 to 1.

The release carrier paper was fed over the transfer roll by means of a steel drive roll, the paper being fed between the nip formed by the rubber transfer roll and the steel drive roll, at a speed six times as great as the linear speed of the surface of the transfer roll, to provide a smooth, uniform coating of about 0.3 pounds coating per ream (250,000 square inches). The coating was then passed into a hot air oven and cured for 7 seconds at 395° F. The second or reverse side was then similarly coated and cured such that the first side was again heated for 7 seconds at 395° F.

Release paper coated as above described was then coated on the first, twice heated side, by drawing the paper under a shimmed steel bar with 1.0 to 1.5 mils thickness of silicone pressure-sensitive adhesive (after drying and curing). The adhesive employed was SR 574 obtained from the General Electric Company and catalyzed as recommended by General Electric with 1.5% by weight of equal weight parts of dichlorobenzoyl peroxide and silicone oil or dibutyl phthalate. The coating was cured at 300° F. for 2 minutes. The cured adhesive was covered with a 0.002 inch thick strip of Mylar polyester film and compressive force of about 400 pounds per inch applied for 8 minutes.

Slow speed release between the silicone adhesive and silicone release surface was measured with an Instron tester, Model TM. In the slow speed test, a sample ½ inch wide by six inches long was stripped at 90° and at 12 inches per minute and the release measured. This procedure is a modification of TLMI Adhesion Test No. VII-LD, modified for release measurement by securing the sample to be tested with two-sided adhesive tape to a rigid plate with release layer and its carrier exposed, removal of release layer initiated, and the sample clamped in the jaws of the tester. For high speed stripping, the test was conducted on a TLMI tester, samples 1 inch by 6 inches were stripped at 600 inches per minute and at 180°, following TLMI release test method VIII-LD270. Stripping or release forces typically measured were, after the indicated storage time following preparation of the laminate, as follows, storage being at standard conditions (room temperature and atmospheric pressure);

| Storage Time | Release Force, Grams |
|---|---|
| LOW SPEED | |
| Zero | 9–16 grams |
| 24 hours | 14–24 grams |
| 1 week | 15–25 grams |
| HIGH SPEED | |
| Zero | 25–30 grams |
| 24 hours | 25–30 grams |
| 1 week | 25–50 grams |

EXAMPLE II

Ten grams of ICI release prepolymer EP6396 was dissolved in 87 grams of heptane. To this solution was added one (1.0) c.c. of a 40% by weight solution of triacetoxy methyl silane in toluene, and 0.5 grams of di-N-butyl tin dioctoate, a known silicone catalyst. This mixture was coated using a Number 4 Mayer rod onto a film of Mylar polyester, dried and cured in an oven for 20 seconds at 275° F. When overcoated with General Electric SR574 silicone pressure-sensitive adhesive, laminated and tested, all as set forth in Example I, low release values immediately and after storage for one week were obtained.

Example II, when coated on untreated paper did not give low release values. However, if the paper is provided with a suitable barrier coating, e.g. a conventional cured silicone release coating such as the materials of FIG. 3 or 6, paper can be used as the support.

EXAMPLE III

General Electric experimental pressure-sensitive adhesive No. 404-333 was substituted for adhesive SR574 in Example I and laminated and tested as therein described. Similar release values were obtained.

As further examples IV and V, either of the prepolymers of FIGS. 2 and 5, each having the high IR absorption ratio herein defined, can be used when suitably cured with catalyst such as the catalyst of Example I. Improved release properties for silicone adhesives are obtained.

EXAMPLE VI

A mixture of one part by weight Q-2-7045 was mixed with ten parts Q-2-7044, obtained from the Dow Corning Corporation, and the mixture substituted for the ICI material specified in Example I. Q-2-7044 is understood to be a polysiloxane having a plurality of reactive vinyl substituents attached to its silicone atoms, a viscosity of about 300 centipoises, and a molecular weight of about 15,000, corresponding to a degree of polymerization of about 200. It also contains a platinum catalyst. Q-2-7045 is understood to be approximately 60% by weight Q-2-7044 and 40% of a polymethylhydrogensiloxane of low molecular weight, understood to have a degree of polymerization of about 40 units and having an IR ratio as herein defined substantially greater than 0.4, the reactive hydrogen substituents cross-linking with the vinyl groups of the prepolymers of Q-2-7044. The material was coated, cured, and tested as stated in Example I, except that the rubber transfer roll and the steel drive roll were driven at the same speed which was greater than the surface speed of the gravure roll by ten percent or more, and a coating weight between one and two pounds per ream was applied. Similar results were obtained.

Examples I and VI are preferred, Example VI being most preferred because of its current availability. It is also preferred to use a pressure-sensitive silicone adhesive containing an appreciable number of essentially inert substituents other than methyl, for example phenyl groups, as disclosed for example in U.S. Pat. Nos. 2,857,356 and 3,839,075. Such groups may be provided, for example, by incorporating in the polymer monomer units of phenyl-methyl siloxane. Inclusion of "M" and "Q" units as described in the above patents is also preferred. The amount of such "M" and "Q" units can be varied to vary the tack of the resulting adhesives.

In each of the above Examples, the pressure-sensitive laminates described consisted of a support layer of Mylar film or tape, one surface of a silicone pressure-sensitive adhesive layer adhered to one surface of the film, a cured, highly cross-linked silicone release polymer layer removably adhered to the other surface of the adhesive layer, and a release paper carrier adhered to the release layer on the side opposite the adhesive. The adhesive can be readily stored, handled, dispensed and applied in this form. To form a spirally-wound tape, the silicone release layer would be applied to the side of the Mylar opposite the adhesive and no separate carrier sheet would be needed. For a transfer tape, both sides of the Mylar or other support would be coated with a release layer. It should be noted that low release values were obtained even though the adhesive was applied and cured directly on the release surface.

Each of the above Examples provides the high degree of cross-linking herein disclosed. In all of the foregoing Examples polysiloxane prepolymers having a plurality of silicon-bonded hydrogen substituents were cross-linked together with compounds having a plurality of vinyl, hydroxyl or ester groups co-reactive with the hydrogen substituents. These prepolymers are believed to have substantially the following structure:

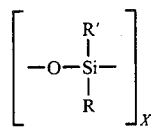

wherein R' is lower alkyl, preferably methyl, R is partially or entirely hydrogen and the balance if any is lower alkyl, and X is below about 350 and preferably less, such low molecular weights providing a Brookfield viscosity at 25° C. below about 1000 centipoises and preferably less. Such prepolymers are believed to be substantially homopolymers of methylhydrogensiloxan wherein X is about 40 or copolymers thereof with dimethylsiloxane wherein X is greater than 40 but preferably below about 350.

The above prepolymers, suitable catalyzed, are copolymerized and highly cross-linked together by cross-linking with materials having a plurality of groups co-reactive with the hydrogen substituents. In the Examples, the following cross-linking materials were employed:
  (1) dicyclopentadiene and/or silanol terminated polydimethylsiloxane—Examples I, III, IV and V
  (2) methyl-triacetoxy silane—Example II
  (3) polysiloxane prepolymers having a plurality of vinyl substituents—Example VI The polysiloxanes of (3) above are believed to have substantially the following formula:

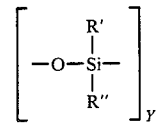

wherein R' is lower alkyl, principally methyl, R" is a mixture of vinyl and lower alkyl groups and Y is below about 350.

The polysiloxanes employed should comprise the major portion of the coating composition. Where hydrocarbon cross-linking agents such as dicyclopentadiene are used, they are preferably small and used in limited amounts sufficient to provide a highly cross-linked silicone. Where co-reactive polysiloxane prepolymers are employed the ratio may vary considerably provided sufficient quantities of each reactive group are employed to produce a dense, highly cross-linked silicone. Thus in Example VI a minor portion of silicon-bonded hydrogen-containing prepolymer is employed where it has a substantial number of reactive hydrogen substituents. Undue stoichiometric excess of unreacted silicon-bonded hydrogen substituents is preferably avoided.

It is also known that hydroxyl and alkoxy groups are co-reactive with silicon-bonded hydrogen polysiloxane substituents.

Cure of the release coatings of this invention should be carried substantially to completion, i.e. until stable, low release values are obtained. A minimum of free reactive groups at the surface is considered desirable. Substantially complete cure can be achieved by using sufficient heat and time, e.g. from about 7 to about 28 seconds at 395° F. or higher. Infra-red heaters can usefully be employed at the end of the cure cycle, for example to raise the coating temperature momentarily to about 500° F. Alternatively, where too high release values are initially obtained, improvement can sometimes be provided by chemically converting free surface reactive groups to more inert groups. For example, free surface Si-H groups may be treated with reactive silanes free of such groups, such as a gas phase exposure to a mixture of trichloro-methyl-silane and dichloro-dimethyl silane for 5 seconds at 225° F., or a liquid treatment with a 3% by weight solution of trimethoxymethyl silane in heptane, with di-N-butyl tin diacetate as catalyst, followed by drying. Curing with sufficient heat is preferred.

Control of moisture during cure may also be important in obtaining low release values, especially for low coating weights. Ambient moisture in the drying and curing air has not been a problem and reasonable care in excluding contamination or condensation of water in the coating prepolymer mixture is sufficient. However, excess moisture in the carrier paper, where used, can cause problems, and it is preferred that the paper have a moisture content by weight of about 4% or less. Predrying can be employed, if necessary.

Good coating technique should be employed. Sufficient coating material should be applied to obtain a smooth uniform coating preferably between about 0.2 and 2.0 pounds of cured release coating per ream (250,000 square inches). Higher coating weights between about 1.0 and 2.0 pounds per ream are preferred. These coating weights are used for normal support surfaces having a good hold-out surface. Higher amounts may be required when the liquid release materials are applied to more porous surfaces to compensate for absorption into the support.

High speed release forces are often more important than low speed release because of the common use of high speed applicating equipment. High speed release forces less than about 200 grams per inch of width are preferred, forces less than about 100 grams more preferred, and about 50 grams or less per inch of width most preferred. On information and belief, such low values were not obtainable in consistent commercial practice prior to the discovery herein disclosed, especially where the adhesive coating is formed directly on the release surface. Low release values are particularly important where paper is used as a carrier due to its limited strength, and where high speed applicating equipment is used.

It should be understood that the foregoing description is for the purpose of illustration only and that the invention includes all modifications and equivalents within the scope of the appended claims.

What is claimed is:

1. An article comprising
    a support having a release on at least one side, and a pressure sensitive alkylarylpolysiloxane adhesive over the release;
    said release comprising the cross-linked reaction product of (a) a polysiloxane prepolymer having two or more reactive vinyl groups and (b) a polysiloxane prepolymer having more than two reactive hydrogen groups, said release prepolymers having a viscosity below about 1000 centipoises at 25° C.

2. An article as defined in claim 1 wherein the cross-linked reaction product is formed from a mixture of polysiloxane prepolymers having a viscosity below about 600 centipoises at 25° C.

3. An article as defined in claim 1 wherein two of the vinyl groups occupy terminal positions.

4. An article as defined in claim 2 wherein the viscosity is about 300 centipoises or below at 25° C.

5. An article as defined in claim 1 wherein the cross-linked reaction product is produced using a catalyst of a noble metal complex.

6. An article as defined in claim 5 wherein the noble metal complex is of the platinum group including platinum and rhodium.

7. An article as defined in claim 6 wherein the viscosity is 100 cps. or below.

8. The method of producing a pressure sensitive alkylarylpolysiloxane adhesive with a silicone release comprising the steps of
    (a) forming on at least one side of a support a release which is a continuous cross-linked and inert reaction product of a polysiloxane prepolymer having two or more reactive vinyl groups and a polysiloxane prepolymer having more than two reactive hydrogen groups, said release prepolymers having a viscosity below about 1000 centipoises at 25° C.
    (b) applying a pressure sensitive alkylarylpolysiloxane adhesive over said release.

9. The method of claim 8 wherein the cross-linked and inert reaction product is produced using a catalyst of a noble metal complex.

10. The method of claim 9 wherein the noble metal complex is of the platinum group including platinum and rhodium.

* * * * *